US011098201B2

United States Patent
Nagai et al.

(10) Patent No.: US 11,098,201 B2
(45) Date of Patent: Aug. 24, 2021

(54) CARBON BLACK FOR BATTERIES, CONDUCTIVE COMPOSITION FOR ELECTRODES, ELECTRODE FOR BATTERIES, AND BATTERY

(71) Applicant: DENKA COMPANY LIMITED, Tokyo (JP)

(72) Inventors: Tatsuya Nagai, Machida (JP); Shinichiro Osumi, Machida (JP); Daiki Ikeda, Omuta (JP); Tetsuya Ito, Machida (JP); Hiroshi Yokota, Machida (JP)

(73) Assignee: DENKA COMPANY LIMITED, Tokyo (JP)

( * ) Notice: Subject to any disclaimer, the term of this patent is extended or adjusted under 35 U.S.C. 154(b) by 112 days.

(21) Appl. No.: 16/327,265

(22) PCT Filed: Aug. 8, 2017

(86) PCT No.: PCT/JP2017/028762
§ 371 (c)(1),
(2) Date: Feb. 21, 2019

(87) PCT Pub. No.: WO2018/037910
PCT Pub. Date: Mar. 1, 2018

(65) Prior Publication Data
US 2019/0177551 A1 Jun. 13, 2019

(30) Foreign Application Priority Data
Aug. 24, 2016 (JP) .............................. JP2016-163253

(51) Int. Cl.
*C09C 1/54* (2006.01)
*H01B 1/04* (2006.01)
(Continued)

(52) U.S. Cl.
CPC .................. *C09C 1/54* (2013.01); *C09C 1/00* (2013.01); *H01B 1/04* (2013.01); *H01B 1/24* (2013.01);
(Continued)

(58) Field of Classification Search
CPC ..................................................... H01M 4/625
See application file for complete search history.

(56) References Cited

U.S. PATENT DOCUMENTS

2004/0023116 A1* 2/2004 Fujino ............... H01M 10/0525
429/231.95
2013/0122354 A1 5/2013 Sugimori et al.
(Continued)

FOREIGN PATENT DOCUMENTS

EP 3 011 617 A1 4/2016
JP 2003234104 A 8/2003
(Continued)

OTHER PUBLICATIONS

International Search Report dated Oct. 3, 2017, issued in corresponding International Application No. PCT/JP2017/028762, filed Aug. 8, 2017, 2 pages.
(Continued)

*Primary Examiner* — Robert S Carrico
(74) *Attorney, Agent, or Firm* — Christensen O'Connor Johnson Kindness PLLC

(57) ABSTRACT

An object of the present invention is to provide a carbon black for batteries having excellent dispersibility, electron conductivity and oxidation resistance. In addition, an object of the present invention is to provide a low-viscosity conductive composition for an electrode produced using the carbon black, and a low-resistance battery electrode and a battery having excellent high-output characteristics and cycle characteristics produced using the conductive composition.

(Continued)

A carbon black for batteries having: BET specific surface area of 50 to 220 $m^2/g$; a crystallite diameter (La) of 30 to 42 Å; and a number of $CO_2$ desorption molecules per unit surface area measured by a temperature-rising desorption gas analysis method (50° C. to 1200° C. of measurement temperature) of $8.0 \times 10^{16}$ to $15.0 \times 10^{16}$ molecules/$m^2$ is excellent in dispersibility, electron conductivity and oxidation resistance. A conductive composition for a low-viscosity electrode produced using the carbon black, and a low-resistance battery electrode and a battery having excellent high-output characteristics and cycle characteristics produced using the conductive composition can be obtained.

6 Claims, 1 Drawing Sheet

(51) Int. Cl.

| | | |
|---|---|---|
| *H01M 4/62* | (2006.01) | |
| *C09C 1/00* | (2006.01) | |
| *H01B 1/24* | (2006.01) | |
| *H01M 4/133* | (2010.01) | |
| *H01M 4/1393* | (2010.01) | |
| *H01M 4/13* | (2010.01) | |
| *H01M 10/052* | (2010.01) | |

(52) U.S. Cl.
CPC ......... *H01M 4/133* (2013.01); *H01M 4/1393* (2013.01); *H01M 4/625* (2013.01); *C01P 2002/60* (2013.01); *C01P 2006/12* (2013.01); *C01P 2006/40* (2013.01); *C01P 2006/60* (2013.01); *H01M 4/13* (2013.01); *H01M 4/623* (2013.01); *H01M 10/052* (2013.01)

(56) References Cited

U.S. PATENT DOCUMENTS

| | | | |
|---|---|---|---|
| 2013/0209889 A1* | 8/2013 | Takahata | H01M 4/663 429/231.1 |
| 2013/0295462 A1 | 11/2013 | Atanassova et al. | |
| 2014/0106240 A1* | 4/2014 | Kotani | H01M 4/50 429/405 |
| 2014/0377659 A1* | 12/2014 | Oljaca | H01M 4/505 429/221 |
| 2015/0311533 A1* | 10/2015 | Tachibana | C09D 1/00 429/232 |
| 2016/0293959 A1 | 10/2016 | Blizanac et al. | |
| 2018/0269467 A1 | 9/2018 | Sonoda et al. | |

FOREIGN PATENT DOCUMENTS

| | | |
|---|---|---|
| JP | 2009035598 A | 2/2009 |
| JP | 2012-059466 A | 3/2013 |
| JP | 2013093171 A | 5/2013 |
| JP | 2015509119 A | 3/2015 |
| WO | 03067690 A1 | 8/2003 |
| WO | 2012014616 A1 | 2/2012 |
| WO | 2016063924 A1 | 4/2016 |
| WO | 2016088880 A1 | 6/2016 |

OTHER PUBLICATIONS

Extended European Search Report dated May 24, 2019, issued in corresponding European Application No. 17843395.9, 7 pages.

* cited by examiner

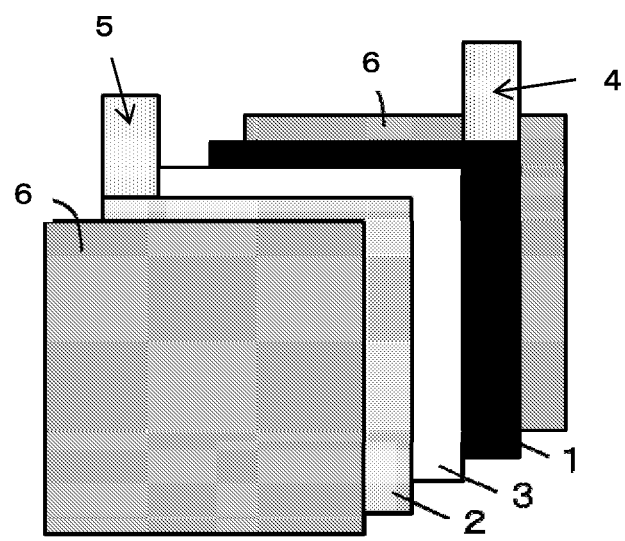

CARBON BLACK FOR BATTERIES, CONDUCTIVE COMPOSITION FOR ELECTRODES, ELECTRODE FOR BATTERIES, AND BATTERY

TECHNICAL FIELD

The present invention relates to a carbon black for batteries, and a conductive composition for an electrode, an electrode for batteries and a battery using the carbon black.

BACKGROUND ART

Development of technologies to realize a low-carbon society that reduces reliance on fossil fuels has been vigorously pursued due to rising environmental and energy problems. Examples of such technological developments include various developments of: low-pollution vehicles such as hybrid electric vehicles and electric vehicles; natural energy power generation and storage systems such as solar power generation and wind power generation; efficient supply of electric power, a next-generation electricity transmission network that reduces power transmission loss; and the like.

One of key devices commonly required for these technologies is a battery, and for such a battery, a high energy density for downsizing a system is required. In addition, high output characteristics are required to enable stable supply of electric power regardless of the operating ambient temperature. In addition, good cycle characteristics and the like which can endure long-term use are also required. For this reason, replacing lithium-ion secondary batteries having higher energy density, output characteristics and cycle characteristics from conventional lead-acid batteries, nickel-cadmium batteries, and nickel-hydrogen batteries has been rapidly progressed.

In recent years, further improvement of the energy density of the lithium ion secondary battery is demanded. For this reason, it is required to reduce the content of the conductive agent in the electrode mixture material. For example, in consumer batteries such as digital equipment, it is said that the content of the conductive agent in the positive electrode mixture is typically 2 mass % or less, more preferably 1 mass % or less.

In view of such circumstances, carbon black as a conductive agent is required to exhibit sufficient electronic conductivity even if the amount thereof is small.

As for carbon black, it has a skeleton in which primary particles close to spherical shape are connected to beads as a common skeleton, and such a skeleton is called "structure". In general, the smaller the primary particle diameter, the more electrical contacts are present in the same mass of conductive agent, and the electron conductivity is improved. Also, the longer the "structure" is connected, the more the electron conductable distance without contact resistance increases, so the electronic conductivity is improved.

Although carbon black having a small primary particle diameter and a long structure has excellent conductivity, the interaction between particles is increased, so that carbon black difficulty breaks down and easily aggregates. Therefore, generally, at the time of manufacturing an electrode, a method of applying a conductive composition for an electrode in which an active material, a conductive agent and a binder are dispersed in water or an organic solvent to a metal foil is used. However, in the case of using carbon black having a small primary particle diameter and a long "structure" as a conductive agent, insufficiency in dispersion easily occurs. For example, aggregates of the conductive agent remain in the conductive composition for electrodes, or it is impossible to apply the conductive composition due to the too high viscosity.

In order to overcome such a problem, for example, Patent Literature 1 proposes to perform kneading in two stages of a neat-kneading step and a dilution-dispersion step. However, the method does not always effect sufficiently for the carbon black having a small primary particle diameter and a long "structure" as described above.

As a means for overcoming the poor dispersion of the conductive agent, there is a method of adding a polyvinylpyrrolidone polymer and a nonionic surfactant as a dispersant (Patent Literature 2). However, although the method described in Patent Literature 2 can improve the poor dispersion of carbon black, when the electrode containing the dispersant is used as a lithium ion battery, the dispersant undergoes oxidative decomposition at a voltage of 4.45 V or higher. This is a problem that the capacity of the battery is lowered. In addition, Patent Literature 3 proposes to realize high conductivity by setting the crystallite diameter (La) of carbon black in the range of 22 Å to 50 Å, but the effect on dispersibility of carbon black is not sufficient.

CITATION LIST

Patent Literature

Patent Literature 1: JP2012-059466
Patent Literature 2: WO2012/014616
Patent Literature 3: JP2015-509119

SUMMARY OF INVENTION

Technical Problem

In view of the above problems and actual circumstances, an object of the present invention is to provide a carbon black for batteries having excellent dispersibility, electron conductivity and oxidation resistance. In addition, an object of the present invention is to provide a low-viscosity conductive composition for an electrode produced using the carbon black, and a low-resistance battery electrode and a battery having excellent high-output characteristics and cycle characteristics produced using the conductive composition.

Solution to Problem

That is, the present invention to solve the above problems is configured as follows.

(1) A carbon black for batteries having: BET specific surface area of 50 to 220 m$^2$/g; a crystallite diameter (La) of 30 to 42 Å; and a number of $CO_2$ desorption molecules per unit surface area measured by a temperature-rising desorption gas analysis method of $8.0 \times 10^{16}$ to $15.0 \times 10^{16}$ molecules/m$^2$, wherein the temperature-rising desorption gas analysis method is performed at 50° C. to 1200° C. of measurement temperature.
(2) The carbon black of (1), wherein the carbon black has DBP oil absorption amount of 240 to 310 mL/100 g.
(3) The carbon black of (1) or (2), wherein the carbon black has a localized electron spin density per unit surface area at 23° C. is $8.0 \times 10^{16}$ spins/m2 or less.
(4) The carbon black of any one of (1) to (3), wherein the carbon black is an acetylene black.

(5) A conductive composition for an electrode comprising an active material, a polymer binder and the carbon black of any one of (1) to (4).
(6) An electrode for batteries manufactured by applying the conductive composition of (5) to a metal foil.
(7) A battery comprising the electrode of (6) as at least one of the positive electrode and the negative electrode.

Unless otherwise specified, the character "-" means a range between the values on the both sides of the character, both inclusive. For example, "A-B" means A or more and B or less.

Advantageous Effects of Invention

As a result of intensive research, the inventors found that both high dispersibility and high conductivity can be achieved by a carbon black for batteries having: BET specific surface area of 50 to 220 m$^2$/g; a crystallite diameter (La) of 30 to 42 Å; and a number of $CO_2$ desorption molecules per unit surface area measured by a temperature-rising desorption gas analysis method (50° C. to 1200° C. of measurement temperature) of $8.0 \times 10^{16}$ to $15.0 \times 10^{16}$ molecules/m$^2$. In addition, the effect of reducing the viscosity of the conductive composition for a electrode produced using the carbon black is high, and a electrode for batteries produced using the battery has low polar plate resistance, and the battery has high output characteristics and excellent cycle characteristics.

BRIEF DESCRIPTION OF THE DRAWINGS

FIG. 1 is a schematic view of a battery in the present invention.

DESCRIPTION OF EMBODIMENTS

Hereinafter, the present invention will be described in detail. It should be noted that the present invention is not limited to the embodiments described below.

Hereinafter, constituent materials of the present invention will be described in detail.
<Carbon Black for Battery>

A carbon black for batteries of the present invention is a carbon black for batteries having: BET specific surface area of 50 to 220 m$^2$/g; a crystallite diameter (La) of 30 to 42 Å; and a number of $CO_2$ desorption molecules per unit surface area measured by a temperature-rising desorption gas analysis method (50° C. to 1200° C. of measurement temperature) of $8.0 \times 10^{16}$ to $15.0 \times 10^{16}$ molecules/m$^2$.

The carbon black for batteries in the present invention is selected from among acetylene black, furnace black, channel black and the like, same as carbon black as a general conductive agent for batteries. Among them, acetylene black is more preferable from the view point of crystallinity and purity.

The BET specific surface area of the carbon black for batteries in the present invention is a value measured by BET one point method under conditions of a relative pressure $p/p_0 = 0.30 \pm 0.04$ and using nitrogen as an adsorption gas.

The carbon black for batteries in the present invention has BET specific surface area of 50 to 220 m$^2$/g, preferably 60 to 175 m$^2$/g, more preferably 60 to 150 m$^2$/g. By setting the BET specific surface area to 220 m$^2$/g or less, inter-particle interaction is suppressed and high dispersibility is easily obtained. In addition, by setting the BET specific surface area to 50 m$^2$/g or more, there are many more electrical contacts among the same mass of battery carbon black, and good electron conductivity is easily obtained. Further, by setting the BET specific surface area to 60 to 150 m$^2$/g, it is easy to achieve both high dispersibility and high electron conductivity.

The crystallite diameter (La) of the carbon black for batteries in the present invention is a value measured in accordance with JIS R 7651. Note that La means a value obtained by measuring the crystallite diameter in the a-axis direction of the carbon black crystal layer.

The carbon black for batteries in the present invention has a crystallite diameter (La) of 30 to 42 Å, preferably 34 to 40 Å. By setting the crystallite diameter (La) to 42 Å or less, the particle shape is more likely to be rounded, so that the interaction among particles is suppressed to easily obtain high dispersibility. Further, by setting the crystallite diameter (La) to 30 Å or more, electrons easily move in the crystal layer, so that favorable electron conductivity can be easily obtained.

(Definition of "Number of $CO_2$ Desorption Molecules Per Unit Surface Area")

In the present invention, a number of $CO_2$ desorption molecules per unit surface area of the carbon black for batteries is defined by a formula (1) in which the number ($CO_2M_2$) is a value calculated by dividing a number of $CO_2$ desorption molecules per unit mass ($CO_2M_1$ [molecules/g]) by the BET specific surface area ($a_{BET}$ [m$^2$/g]).

$$CO_2M_2 = CO_2M_1 / a_{BET} \quad (1)$$

Note that in the present invention, the number of $CO_2$ desorption molecules per unit mass ($CO_2M_1$ [molecules/g]) measured by a temperature-rising desorption gas analysis method (50° C. to 1200° C. of measurement temperature) is a value obtained by measuring the $CO_2$ gas desorbed when the carbon black for batteries is heated from 50° C. to 1200° C. under vacuum with a mass spectrometer.

The carbon black for batteries in the present invention has a number of $CO_2$ desorption molecules per unit surface area measured by a temperature-rising desorption gas analysis method (50° C. to 1200° C. of measurement temperature) of $8.0 \times 10^{16}$ to $15 \times 10^{16}$ molecules/m$^2$, preferably $8.0 \times 10^{16}$ to $13 \times 10^{16}$ molecules/m$^2$, more preferably $8.0 \times 10^{16}$ to $10 \times 10^{16}$ molecules/m$^2$. By setting the number of $CO_2$ desorption molecules per unit surface area measured by a temperature-rising desorption gas analysis method (50° C. to 1200° C. of measurement temperature) to $8.0 \times 10^{16}$ molecules/m$^2$ or more, the affinity between the carbon black for batteries and the solvent is improved to easily obtain high liquid dispersibility. By setting the number of $CO_2$ desorption molecules per unit surface area measured by a temperature-rising desorption gas analysis method (50° C. to 1200° C. of measurement temperature) to $15 \times 10^{16}$ molecules/m$^2$ or less, inhibition of electron conduction due to $CO_2$ of the surface of the carbon black for batteries is suppressed to easily obtain good electron conductivity and high oxidation resistance. By setting the number of $CO_2$ desorption molecules per unit surface area measured by a temperature-rising desorption gas analysis method (50° C. to 1200° C. of measurement temperature) to $10 \times 10^{16}$ molecules/m$^2$ or less, it become easier to achieve all of high liquid dispersibility, high electron conductivity and high oxidation resistance.

The DBP oil absorption amount of the carbon black for batteries in the present invention is a value measured in accordance with JIS K 6217-4.

The carbon black for batteries in the present invention preferably has DBP oil absorption amount of 240 to 310 mL/100 g, more preferably 240 to 260 mL/100 g. By setting the DBP oil absorption amount to 310 mL/100 g or less, agglomeration due to intertwining of aggregate structures is suppressed, and high dispersibility is easily obtained. Further, by setting the DBP oil absorption amount to 240 mL/100 g or more, the aggregate structure has a sufficient length, and good electron conductivity can be easily obtained.

(Definition of "Localized Electron Spin Density")

A localized electron spin density per unit surface area ($D_1$ [spins/m$^2$]) of the carbon black for batteries in the present invention is defined by a formula (2) in which the density ($D_1$) is a value calculated by dividing a localized electron spin density per unit mass ($N_1$ [spins/g]) by the BET specific surface area ($a_{BET}$ [m$^2$/g]).

$$D_1 = N_1/a_{BET} = (N-N_c)/a_{BET} \quad (2)$$

Here, N is a total number of electron spins per unit mass of the carbon black for batteries, and $N_c$ is a number of conduction electron spins per unit mass of the carbon black for batteries.

(Definition of "Total Number of Electron Spins")

The total number of electron spins per unit mass (N) of the carbon black for batteries is a value defined by a formula (3).

$$N = I/I_{REF} \times \{s(s+1)\}/\{S(S+1)\} \times N_{REF}/M \quad (3)$$

Here, I is a electron spin resonance (ESR) signal intensity of the carbon black for batteries, $I_{REF}$ is a ESR signal intensity of a standard sample, S is a spin quantum number of the carbon black for batteries (i.e., S=½), s is a spin quantum number of the standard sample, $N_{REF}$ is a spin number of the standard sample, and M is a mass of the carbon black for batteries.

The type of the standard sample is not particularly limited, but, for example, a polyethylene film or the like into which ions whose spin quantum number is known are injected by an electrochemical method or the like can be used. The method of determining the spin number of the standard sample ($N_{REF}$) is not particularly limited, but, for example, a method of measuring the concentration of ions whose spin quantum number is known by a titration method can be used.

(Definition of "Number of Conduction Electron Spins")

The number of conduction electron spins per unit mass ($N_e$) of the carbon black for batteries is defined by a formula (4).

$$N = A/T + N_c \quad (4)$$

However, A is a constant, and T is the absolute temperature [K] of the carbon black for batteries.

That is, the number of conduction electron spins per unit mass ($N_e$) of the carbon black for batteries can be determined, for example, as follows. First, the total number of electron spins (N) of the carbon black for batteries is measured at two or more different temperatures. The two or more numbers (N) are plotted on a graph in which N is the vertical axis and the reciprocal the measurement temperature expressed in absolute temperature units (1/T) is the horizontal axis. Next, a regression line of the graph is calculated by the method of least squares, and the value of the intercept (that is, the extrapolation value to 1/T=0) is defined as $N_c$.

The localized electron spin density per unit surface area of the carbon black for batteries in the present invention at 23° C. is preferably $8.0 \times 10^{16}$ spins/m$^2$ or less, and usually $1.0 \times 10^{16}$ spins/m$^2$ or more. The lower the localized electron spin density, the less the sites called lattice defects or edges which are likely to cause side reactions such as decomposition reaction of the electrolyte solution under high voltage exist, so that it is easier to obtain high oxidation resistance.

The method for producing the carbon black for batteries in the present invention is not particularly limited method, but in an method, a raw material gas such as hydrocarbon or natural gas is supplied from a nozzle at the top of a vertical reactor, the carbon black for batteries is produced by thermal decomposition reaction and/or combustion reaction, and then collected from a bag filter directly connected to the bottom of the reactor. The raw material gas to be used is not particularly limited, but it is preferable to use an acetylene gas with less impurities such as sulfur. In the case of removing the sulfur from the obtained carbon black, for example, the carbon black is heated at 1,000 to 1,500° C. for 1 hour or more under an inert atmosphere or an inert gas stream using a baking furnace such as a muffle furnace.

In addition to the acetylene gas, an oxygen gas and a steam, for example, a hydrocarbon gas, a hydrogen gas, a carbon dioxide gas, or the like can be added as a raw material gas used in manufacturing the carbon black for batteries in the present invention. Examples of the hydrocarbon gas include gas such as methane, ethane, propane, ethylene, propylene, butadiene and the like gas and gasified oily hydrocarbons such as benzene, toluene, xylene, gasoline, kerosene, light oil and heavy oil the like gas. When these gases are added, the reaction temperature varies, so that the BET specific surface area, the crystallite diameter and the number of $CO_2$ desorption molecules per unit mass measured by a temperature-rising desorption gas analysis method (50° C. to 1200° C. of measurement temperature) can be easily increased or decreased. Further, by changing the added oxygen gas and hydrocarbon gas ratio, it is also possible to increase or decrease the number of $CO_2$ desorption molecules per unit mass measured by a temperature-rising desorption gas analysis method (50° C. to 1200° C. of measurement temperature) of the obtained carbon black.

<Conductive Composition for an Electrode>

A conductive composition for an electrode of the present invention comprises an active material, a polymer binder and the above carbon black for batteries. The conductive composition for an electrode of the present invention may further comprise a removable component such as a solvent.

Since the conductive composition of the present invention comprises the above carbon black for batteries, interaction between particles is suppressed, and the conductive composition for an electrode has a feature of low viscosity.

(Active Material)

Examples of the active material in the present invention, as a positive electrode, include: a composite oxide having a layered rock-salt type structure such as lithium cobaltate, lithium nickelate, lithium nickel manganese cobaltate, lithium nickel cobalt aluminum oxide and the like; a composite oxide having a spinel type structure such as lithium manganate, lithium nickel manganate and the like; a composite oxide having an olivine type structure such as lithium iron phosphate, lithium manganese phosphate, lithium manganese phosphate and the like. Examples of the active material in the present invention, as a negative electrode, include: a carbon-based material such as artificial graphite, natural graphite, soft carbon, hard carbon and the like; a metal-based material alloyed with an alkali metal such as silicon, tin and the like; a metal complex oxide such as lithium titanate and the like.

(Polymer Binder)

Examples of the polymeric binder in the present invention include a polymer binder such as polyvinylidene fluoride, polytetrafluoroethylene, styrene-butadiene copolymer, polyvinyl alcohol, acrylonitrile-butadiene copolymer, carboxylic acid-modified (meth) acrylate copolymer and the like.

Among them, polyvinylidene fluoride is preferable in terms of oxidation resistance when used for the positive electrode, and polyvinylidene fluoride or styrene-butadiene copolymer is preferable in terms of adhesion when used for the negative electrode.

<Method for Producing Conductive Composition for Electrode>

Known methods can be used for producing the conductive composition for an electrode in the present invention. For example, it can be obtained by mixing a dispersion in a solvent of the carbon black for batteries, the active material and the polymeric binder with a ball mill, a sand mill, a twin-screw kneader, an orbital revolving stirrer, a planetary mixer, a disper mixer or the like. The conductive composition is usually used in the form of a slurry. As the carbon black for batteries, the active material and the polymer binder, those described above may be used. Examples of the dispersion medium (the solution in which the carbon black etc. are to be dispersed) of the conductive composition include water, N-methylpyrrolidone, cyclohexane, methyl ethyl ketone, methyl isobutyl ketone, and the like. When polyvinylidene fluoride is used as a polymeric binder, N-methylpyrrolidone is preferable from the viewpoint of solubility. When a styrene-butadiene copolymer is used as a polymeric binder, water is preferable from the viewpoint of solubility. In addition, it is preferable that the slurry of the prepared conductive composition for a electrode is defoamed in vacuum prior to applying not to suppress occurring defects in a coating film and to make the surface of the coating film smooth. When air bubbles are present in the slurry of the conductive composition, defects occur in the coating film on the electrode for batteries, which causes a loss of smoothness.

<Electrode for Battery>

A electrode for batteries of the present invention comprises the above carbon black for batteries. Since the electrode for batteries of the present invention uses carbon black having good electron conductivity, the electrode can be a low resistance electrode.

Known methods can be used for manufacturing the electrode for batteries in the present invention. For example, the above carbon black for batteries is formed into the slurry of the conductive composition for a electrode by the above methods. After applying the slurry of the conductive composition to a current collector such as an aluminum foil or a copper foil, the solvent contained in the slurry is removed by heating to form an electrode composite layer, which is a porous body in which the active material is bonded to the surface of the current collector via the polymer binder. Further, by pressurizing the current collector and the electrode composite layer by roll-pressing or the like to be stuck each other. Then, a desired battery electrode can be obtained.

<Battery>

A battery of the present invention comprises the above electrode for batteries. The battery of the present invention is excellent in high output characteristics because of low electrode resistance and has good cycle resistance due to good oxidation resistance.

The manufacturing method of the battery used in the present invention is not particular limited and it may be done using a conventionally known method for manufacturing a secondary battery. For example, in the configuration schematically shown in FIG. 1, it can also be produced by the following method. That is, an aluminum tab 4 is welded to the positive electrode 1 comprising the electrode and a nickel tab 5 is welded to a negative electrode 2. Then, a polyolefin microporous membrane 3 to be an insulating layer is disposed between the electrodes. The electrolyte solution is injected until the nonaqueous electrolytic solution sufficiently permeates into voids of the positive electrode 1, the negative electrode 2 and the polyolefin microporous membrane 3, and is sealed with the external package 6.

The battery of the present invention can be used in a wide range of fields and applications thereof are not particularly limited, but examples thereof include: portable AV devices such as digital cameras, video cameras, portable audio players and portable liquid crystal televisions; portable information terminals such as laptop computers, smart phones and mobile PCs, portable game devices; electric power tools; electric bicycles; hybrid vehicles; electric vehicles; electric power storage systems; and the like.

EXAMPLES

Hereinafter, the present invention will be described more specifically with reference to Examples and Comparative Examples, but the present invention is not limited to the following Examples as long as the gist is not impaired.

Example 1

A raw material gas was mixed in a mixing ratio of 65 vol % of acetylene gas, 17.5 vol % of oxygen gas, 0 vol % of steam and 17.5 vol % of toluene gas as hydrocarbon gas and sprayed from a nozzle installed at the top of a carbon black production furnace (furnace overall length 5 m, furnace diameter 0.5 m). A carbon black for batteries was produced by thermal decomposition and/or combustion reaction of acetylene gas, and the carbon black for batteries was collected from the bag filter directly connected to the lower part of the furnace. The ejection speed of the raw material gas was set to 6.5 m/s by adjusting the nozzle diameter. Hereinafter, the carbon black for batteries manufactured under the above production conditions is called "carbon black A (CBA)".

[BET Specific Surface Area]

BET specific surface area was measured by BET one point method under conditions of a relative pressure $p/p_0=0.30\pm0.04$ and using nitrogen as an adsorption gas. The evaluation results are shown in Table 1.

[Crystallite Diameter (La)]

The crystallite diameter (La) was measured in accordance with JIS R 7651. Using X-ray diffractometer ("D8ADVANCE" manufactured by Brucker), X-ray diffraction was carried out using CuK α ray under the conditions of measurement range 2θ=10 to 40° and slit width 0.5°. X-ray standard silicon (metal silicon manufactured by Mitsuwa Chemicals Co., Ltd.) was used for calibration of the measurement angle. Using the diffraction line of the obtained (110) plane, the crystallite diameter (crystallite size) La was determined by the equation (4), which is the Scherrer's equation.

$$La(\text{Å})=(K\times\lambda)/(\beta\times\cos\theta) \quad (4)$$

Here, K is 0.9 of the shape factor constant, λ is 1.54 Å of the wavelength of the X-ray, θ is the angle showing the maximum value in the (110) plane diffraction ray absorption band, β is the half width (radian) in the (110) plane diffraction line absorption band. The evaluation results are shown in Table 1.

[Number of $CO_2$ Desorption Molecules Per Unit Surface Area Measured by a Temperature-Rising Desorption Gas Analysis Method]

The number of $CO_2$ desorption molecules per unit surface area was measured by a temperature-rising desorption gas analysis method was measured by the following procedure. 2 mg of the carbon black for batteries was placed on a quartz planchet using a temperature-rising desorption gas analyzer (TDS 1200 II, manufactured by ESCO, Ltd.), and the quartz planchet was covered with a SiC lid (with a hole). Then, the quartz planchet was set in a chamber and vacuumed to $1 \times 10^{-6}$ Pa or less. After the degree of vacuum was stable, the measurement temperature was raised from 50° C. to 1200° C. at a heating rate of 60° C./min, and the number of $CO_2$ molecules to be eliminated at that time was measured with a temperature-rising desorption gas analyzer. By dividing the obtained number of $CO_2$ molecules by the BET specific surface area of the carbon black for batteries, the number of $CO_2$ desorption molecules per unit surface area was calculated. The evaluation results are shown in Table 1.

DBP oil absorption amount was measured in accordance with JIS K 6217-4. The evaluation results are shown in Table 1.

[Localized Electron Spin Density Per Unit Surface Area at 23° C.]

A localized electron spin density per unit surface area at 23° C. was measured by the following method. ESR signal of the carbon black at sample temperatures of −263, −253, −233, −173, −113, −53, and 23° C. was measured with an electron spin resonance measuring apparatus (ESP 350 E manufactured by Bruker) under the conditions 3383 Gauss of the center magnetic field, 200 Gauss of the field sweep width. Since the ESR signal is outputted in a differential form, the ESR signal intensity was calculated by integrating it twice in the entire region. Next, the ESR signal intensity of ion-implanted polyethylene film having a known number of spins (thickness 300 μm, spin number $5.5 \times 10^{13}$ spins/g) was measured under the same conditions. Using this as a standard sample, the total number of electron spins of the sample the carbon black at each temperature was calculated. Then, a graph in which the total number of electron spins is the vertical axis and the reciprocal the measurement temperature expressed in absolute temperature units is the horizontal axis was prepared, and the number of conduction electron spins was calculated, the number of conduction electron spins was the intercept value of the regression line calculated by the method of least squares. Then, the localized electron spin density was calculated by dividing the number of the localized electron spins by the BET specific surface area of the carbon black for batteries, wherein the number of the localized electron spins was calculated by subtracting the number of conduction electron spins from the number of total electron spins at 23° C. The evaluation results are shown in Table 1.

[Evaluation of Dispersibility of Carbon Black for Battery]

The dispersibility of the carbon black for batteries, the carbon black is a coarse particle, was evaluated by a method using a grain gauge described in JIS K 5600-2-5. Specifically, 300 mg of carbon black CBA for batteries and 300 mg of N-methylpyrrolidone (manufactured by Kanto Chemical Co., Inc., hereinafter referred to as NMP) as a solvent were weighed, and mixed by a planetary centrifugal mixer (THINKY MIXER ARV-310, manufactured by THINKY CORPORATION) to be uniform. Then, 10 mg of the mixture of CBA and MNP was applied by a scraper. A scale of a place where in one channel, there were three or more linear marks continuous by 10 mm or more on the sample surface was measured. The lower the numerical value of the grain gauge, the better dispersibility it means. The evaluation results are shown in Table 1.

[Evaluation of Oxidation Resistance of Carbon Black for Battery]

The oxidation resistance of the carbon black for batteries was evaluated by the following method. 100 mg of carbon black CBA for batteries, 100 mg of polyvinylidene fluoride ("HSV 900", manufactured by Arkema Co., hereinafter referred to as PVdF) as a polymer binder and 300 mg of N-methylpyrrolidone (manufactured by Kanto Chemical Co., Inc., hereinafter referred to as NMP) as a solvent were weighed, and mixed by a planetary centrifugal mixer (THINKY MIXER ARV-310, manufactured by THINKY CORPORATION) to be uniform. The mixture was applied to an aluminum foil so that the dry thickness is 20 and dried at 105° C. for 1 hour to obtain a test piece. A three-pole cell (manufactured by Toyo System Co., Ltd.) was assembled with the test piece obtained as a working electrode, lithium metal (manufactured by Honjo Metal Co., Ltd.) was as a counter electrode and a reference electrode, and an electrolyte (ethylene carbonate/diethyl carbonate=½ (volume ratio)+1 M $LiPF_6$ solution (manufactured by Kishida Chemical Co., Ltd.)). Using an electrochemical measurement system (Function Generator 1260 and Potento Galvanostat 1287, manufactured by Solartron), cyclic voltammetry (hereinafter abbreviated as CV) was performed under the conditions of a scanning speed of 10 mV/sec at 25° C. The current value at 5.0 V was determined as the oxidative decomposition current value of the carbon black for batteries. When the oxidative decomposition current value is lower, it is estimate that the oxidative decomposition hardly occur and the oxidation resistance is higher. The evaluation results are shown in Table 1.

(Preparation of Conductive Composition for Electrode)

Carbon black CBA for batteries obtained above, $LiCoO_2$ ("KD 20" having average primary particle diameter of 15 μm, manufactured by Umicore) as the active material, NMP as the solvent and PVdF as the polymeric binder were prepared. CBA, $LiCoO_2$ and PVdF were weighed and mixed so that carbon black CBA for batteries was 0.5% by mass in solid content, $LiCoO_2$ in solid content was 98.5% by mass and PVdF in solid content was 1.0% by mass, and then NMP was added thereto so that the solid content thereof was 78% by mass. The mixture was mixed by a planetary centrifugal mixer (THINKY MIXER ARV-310, manufactured by THINKY CORPORATION) to be uniform, and the conductive composition for a electrode was obtained.

[Evaluation of Dispersibility of Conductive Composition for Electrode]

The dispersibility of the conductive composition for a electrode was evaluated as a viscosity by the method using a rotary type rheometer in accordance with JIS K7244-10. Specifically, 1 g of an electrode composition having a solid content of 78 mass % was applied to a disk, and the viscosity at the shear rate of 1 $s^{-1}$ was measured changing the shear rate from 100 $s^{-1}$ to 0.01 $s^{-1}$, using a rotary type rheometer (MCR 300, manufactured by Anton Paarl Co., Ltd.). The lower the numerical value of the viscosity, the better the dispersibility means. The evaluation results are shown in Table 1.

(Preparation of Electrode for Battery)

A film was formed with the prepared conductive composition for an electrode on an aluminum foil (manufactured by UACJ) having a thickness of 15 μm by an applicator, and placed in an oven at 105° C. for 1 hour to be preliminarily dried. Next, it was pressed with a roll press machine at a linear pressure of 200 kg/cm to prepare a film so as to have a thickness of 60 µm including the aluminum foil having a thickness of 15 µm. In order to remove volatile components, it was dried in vacuum at 170° C. for 3 hours to obtain the electrode for batteries.

[Evaluation of Electrode Resistance of Electrode for Battery]

Using the electrochemical measurement system (Function Generator 1260 and Potentiostat Galvanostat 1287, manufactured by Solartron), the produced electrode for batteries was cut out into a disk shape having a diameter of 14 mm and the front and back surfaces were sandwiched between flat plate electrodes made of SUS 304, and the AC impedance was measured under the conditions of an amplitude voltage of 10 mV and a frequency range of 1 Hz to 100 kHz. A resistance value calculated by multiplying the obtained resistance component value by area of the cut-out disk shape was defined as the electrode plate resistance. The evaluation results are shown in Table 1.

(Preparation of Negative Electrode)

A pure water (manufactured by Kanto Chemical Co., Inc.) as a solvent, an artificial graphite ("MAG-D" manufactured by Hitachi Chemical Co., Ltd.) as a negative electrode active material, a styrene butadiene rubber ("BM-400B" manufactured by Zeon Corporation, hereinafter referred to as SBR) as a binder, and carboxymethyl cellulose ("D2200", manufactured by Daicel Corporation, hereinafter referred to as CMC) are prepared respectively. Next, CMC and the artificial graphite were weighed and mixed so that CMC was 2% by mass in solid content and the artificial graphite in solid content was 97% by mass, and then the pure water was added thereto. The mixture was mixed by a planetary centrifugal mixer (THINKY MIXER ARV-310, manufactured by THINKY CORPORATION) to be uniform, and a negative electrode slurry for a nonaqueous battery was obtained.

Next, a film was formed with the negative electrode slurry for a nonaqueous battery on a copper foil (manufactured by UACJ) having a thickness of 10 µm by an applicator, and placed in an oven at 60° C. for 1 hour to be preliminarily dried. Next, it was pressed with a roll press machine at a linear pressure of 100 kg/cm to prepare a film so as to have a thickness of 40 µm including the copper foil. In order to completely remove residual moisture, it was dried in vacuum at 120° C. for 3 hours to obtain the negative electrode.

(Preparation of Battery)

In a dry room controlled to a dew point of −50° C. or less, it is configured so that the positive electrode and the negative electrode was placed for the coated surfaces of the electrode composites to face each other at each center and a polyolefin microporous membrane was placed between the electrodes, wherein the positive electrode was prepared by processing the above electrode for batteries to 40×40 mm, the negative electrode was processed to 44×44 mm and the polyolefin microporous membrane was processed to 45×45 mm. Next, an aluminum laminate sheet cut and processed into 70×140 mm square was folded in half at the center part of the long side, and placed and sandwiched therebetween so that a collecting tab of the electrode was exposed to the outside of the laminate sheet. Next, using a heat sealer, the two sides including the side where the collecting tab of the aluminum laminate sheet was exposed were heated and fused. Then, 2 g of an electrolytic solution was injected from one side not heated and fused to sufficiently permeate into the positive electrode, the negative electrode, and the polyolefin microporous membrane using the battery electrode. While vacuuming the interior of the battery, the remaining side of the aluminum laminate sheet was heated and fused with a vacuum heat sealer to obtain a battery.

For the obtained battery, the battery performance was evaluated by the following methods.

(Evaluation of Battery)

[Discharge Rate Characteristic (Capacity Retention Rate at 3 C Discharge)]

The prepared battery was subjected to constant current/constant voltage charging with a limit of 4.35 V and 0.2 C at 25° C. and then discharged to 3.0 V at a constant current of 0.2 C. Subsequently, the discharge current was changed to 0.2 C, 0.5 C, 1 C, 2 C and 3 C, and discharge capacities with respect to each discharge current were measured. For each measurement, a constant current/constant voltage charging with a limit of 4.35 V and 0.2 C was performed for recovery charge. Then, the capacity retention rate at 3 C discharge with respect to 0.2 C discharge was calculated. The evaluation results are shown in Table 1.

[Cycle Characteristic (Discharge Capacity Retention Rate after Cycles)]

The prepared battery was subjected to constant current/constant voltage charging with a limit of 4.35 V and 1 C at 25° C. and then discharged to 3.0 V at a constant current of 1 C. Subsequently, the above charge and discharge was repeated 500 cycles, and the discharge capacity was measured. The discharge capacity retention rate after cycles at the 500 cycle discharge with respect to 1 cycle discharge was calculated. The evaluation results are shown in Table 1.

Example 2

A carbon black for batteries, a conductive composition for an electrode, an electrode for batteries, and a battery were prepared and evaluated in the same manner as in Example 1 except that the hydrocarbon gas of Example 1 was replaced with benzene (the carbon black for batteries produced under the above manufacturing conditions was referred to as carbon black B (CBB)). The evaluation results are shown in Table 1.

Example 3

A carbon black for batteries, a conductive composition for an electrode, an electrode for batteries, and a battery were prepared and evaluated in the same manner as in Example 1 except that the raw material gas mixing ratio of Example 1 to 69 vol % of oxygen gas and 31 vol % of hydrocarbon gas, and the hydrocarbon gas was replaced with benzene (the carbon black for batteries produced under the above manufacturing conditions was referred to as carbon black C (CBC)). The evaluation results are shown in Table 1.

Example 4

A carbon black for batteries, a conductive composition for an electrode, an electrode for batteries, and a battery were prepared and evaluated in the same manner as in Example 1 except that the raw material gas mixing ratio of Example 1 to 60 vol % of acetylene gas, 2 vol % of oxygen gas, 19 vol % of steam and 19 vol % of hydrocarbon gas, and the hydrocarbon gas was replaced with benzene (the carbon black for batteries produced under the above manufacturing conditions was referred to as carbon black D (CBD)). The evaluation results are shown in Table 1.

Example 5

A carbon black for batteries, a conductive composition for an electrode, an electrode for batteries, and a battery were prepared and evaluated in the same manner as in Example 1 except that the raw material gas mixing ratio of Example 1 to 55 vol % of acetylene gas, 10 vol % of oxygen gas, 10 vol % of steam and 25 vol % of toluene gas as a hydrocarbon gas (the carbon black for batteries produced under the above manufacturing conditions was referred to as carbon black E (CBE)). The evaluation results are shown in Table 1.

Example 6

A carbon black for batteries, a conductive composition for an electrode, an electrode for batteries, and a battery were prepared and evaluated in the same manner as in Example 1 except that the raw material gas mixing ratio of Example 1 to 62 vol % of acetylene gas, 18 vol % of oxygen gas, 2 vol % of steam and 18 vol % of hydrocarbon gas, and the hydrocarbon gas was replaced with benzene (the carbon black for batteries produced under the above manufacturing conditions was referred to as carbon black F (CBF)). The evaluation results are shown in Table 1.

Example 7

A carbon black for batteries, a conductive composition for an electrode, an electrode for batteries, and a battery were prepared and evaluated in the same manner as in Example 1 except that the raw material gas mixing ratio of Example 1 to 25 vol % of acetylene gas, 40 vol % of oxygen gas, 17.5 vol % of steam and 17.5 vol % of toluene gas as a hydrocarbon gas (the carbon black for batteries produced under the above manufacturing conditions was referred to as carbon black G (CBG)). The evaluation results are shown in Table 1.

Comparative Example 1

A carbon black for batteries, a conductive composition for an electrode, an electrode for batteries, and a battery were prepared and evaluated in the same manner as in Example 1 except that the raw material gas mixing ratio of Example 1 to 82 vol % of acetylene gas and 18 vol % of hydrocarbon gas, and the hydrocarbon gas was replaced with benzene (the carbon black for batteries produced under the above manufacturing conditions was referred to as carbon black H (CBI)). The evaluation results are shown in Table 1. In the case of the carbon black for batteries used in Comparative Example 1, the dispersibility and oxidation resistance were good, but the electron conductivity was poor and the electrode plate resistance was high. Also in the battery evaluation, the discharge capacity retention rate at 3 C discharge was low.

Comparative Example 2

A carbon black for batteries, a conductive composition for an electrode, an electrode for batteries, and a battery were prepared and evaluated in the same manner as in Example 1 except that the raw material gas mixing ratio of Example 1 to 67 vol % of acetylene gas, 15 vol % of oxygen gas, 15 vol % of steam and 3 vol % of toluene gas as a hydrocarbon gas (the carbon black for batteries produced under the above manufacturing conditions was referred to as carbon black I (CBI)). The evaluation results are shown in Table 1. In the case of the carbon black for batteries used in Comparative Example 2, the dispersibility and oxidation resistance were poor, the viscosity was high and the electrode plate resistance was high. Also in the battery evaluation, the discharge capacity retention rate at 3 C discharge was low.

Comparative Example 3

A carbon black for batteries, a conductive composition for an electrode, an electrode for batteries, and a battery were prepared and evaluated in the same manner as in Example 1 except that the carbon black for batteries was changed to SuperPLi (manufactured by Imerisu) having the BET specific surface area, the crystallite diameter (La), the number of $CO_2$ desorption molecules per unit surface area measured by a temperature-rising desorption gas analysis method (50° C. to 1200° C. of measurement temperature), the DBP oil absorption amount and the localized electron spin density per unit surface area at 23° C. shown in Table 1. The evaluation results are shown in Table 1. In the case of the carbon black for batteries used in Comparative Example 3, the dispersibility and oxidation resistance were good, but the electron conductivity was poor and the electrode plate resistance was high. Also in the battery evaluation, the discharge capacity retention rate at 3 C discharge was low.

Comparative Example 4

A carbon black for batteries, a conductive composition for an electrode, an electrode for batteries, and a battery were prepared and evaluated in the same manner as in Example 1 except that the carbon black for batteries was changed to ECP (manufactured by Lion Specialty Chemicals Co., Ltd) having the BET specific surface area, the crystallite diameter (La), the number of $CO_2$ desorption molecules per unit surface area measured by a temperature-rising desorption gas analysis method (50° C. to 1200° C. of measurement temperature), the DBP oil absorption amount and the localized electron spin density per unit surface area at 23° C. shown in Table 1. The evaluation results are shown in Table 1. In the case of the carbon black for batteries used in Comparative Example 4, the dispersibility and oxidation resistance were poor, the viscosity was high and the electrode plate resistance was high. Also in the battery evaluation, the discharge capacity retention rate at 3 C discharge was low.

Comparative Example 5

A carbon black for batteries, a conductive composition for an electrode, an electrode for batteries, and a battery were prepared and evaluated in the same manner as in Example 1 except that the raw material gas mixing ratio of Example 1 to 60 vol % of acetylene gas, 2 vol % of oxygen gas, 25 vol % of steam and 13 vol % of hydrocarbon gas, and the hydrocarbon gas was replaced with benzene (the carbon black for batteries produced under the above manufacturing conditions was referred to as carbon black J (CBJ)). The evaluation results are shown in Table 1. In the case of the carbon black for batteries used in Comparative Example 5, the dispersibility and oxidation resistance were poor, the viscosity was high and the electrode plate resistance was high. Also in the battery evaluation, the discharge capacity retention rate at 3 C discharge was low.

Comparative Example 6

A carbon black for batteries, a conductive composition for an electrode, an electrode for batteries, and a battery were prepared and evaluated in the same manner as in Example 1 except that the raw material gas mixing ratio of Example 1 to 57 vol % of acetylene gas, 3 vol % of oxygen gas, 20 vol % of steam and 20 vol % of hydrocarbon gas, and the hydrocarbon gas was replaced with benzene (the carbon black for batteries produced under the above manufacturing conditions was referred to as carbon black K (CBK)). The evaluation results are shown in Table 1. In the case of the carbon black for batteries used in Comparative Example 6, the oxidation resistance was good, but the dispersibility was poor, the viscosity was high and the electrode plate resistance was high. Also in the battery evaluation, the discharge capacity retention rate at 3 C discharge was low.

Comparative Example 7

A carbon black for batteries, a conductive composition for an electrode, an electrode for batteries, and a battery were prepared and evaluated in the same manner as in Example 1 except that the raw material gas mixing ratio of Example 1 to 80 vol % of acetylene gas, 5 vol % of oxygen gas, 7.5 vol % of steam and 7.5 vol % of hydrocarbon gas, and the hydrocarbon gas was replaced with benzene (the carbon black for batteries produced under the above manufacturing conditions was referred to as carbon black L (CBL)). The evaluation results are shown in Table 1. In the case of the carbon black for batteries used in Comparative Example 7, the dispersibility and oxidation resistance were good, but the electron conductivity was poor and the electrode plate resistance was high. Also in the battery evaluation, the discharge capacity retention rate at 3 C discharge was low.

Comparative Example 8

A carbon black for batteries, a conductive composition for an electrode, an electrode for batteries, and a battery were prepared and evaluated in the same manner as in Example 1 except that the raw material gas mixing ratio of Example 1 to 65 vol % of acetylene gas, 16 vol % of oxygen gas, 3 vol % of steam and 16 vol % of toluene gas as a hydrocarbon gas (the carbon black for batteries produced under the above manufacturing conditions was referred to as carbon black M (CBM)). The evaluation results are shown in Table 1. In the case of the carbon black for batteries used in Comparative Example 8, the dispersibility and oxidation resistance were good, but the electron conductivity was poor and the electrode plate resistance was high. Also in the battery evaluation, the discharge capacity retention rate at 3 C discharge was low.

Comparative Example 9

A carbon black for batteries, a conductive composition for an electrode, an electrode for batteries, and a battery were prepared and evaluated in the same manner as in Example 1 except that the raw material gas mixing ratio of Example 1 to 40 vol % of acetylene gas, 10 vol % of oxygen gas, 25 vol % of steam and 25 vol % of hydrocarbon gas, and the hydrocarbon gas was replaced with benzene (the carbon black for batteries produced under the above manufacturing conditions was referred to as carbon black N (CBN)). The evaluation results are shown in Table 1. In the case of the carbon black for batteries used in Comparative Example 9, the dispersibility and oxidation resistance were poor, the viscosity was high and the electrode plate resistance was high. Also in the battery evaluation, the discharge capacity retention rate at 3 C discharge was low.

TABLE 1

| | | Example | | | | | | | Comparative Example | |
|---|---|---|---|---|---|---|---|---|---|---|
| | | 1 | 2 | 3 | 4 | 5 | 6 | 7 | 1 | 2 |
| Kind of carbon black for battery | | CBA | CBB | CBC | CBD | CBE | CBF | CBG | CBH | CBI |
| Ratio of material gas mixture [vol %] | Acetylene gas | 65 | 65 | 0 | 60 | 55 | 62 | 25 | 82 | 67 |
| | Oxygen Gas | 17.5 | 17.5 | 69 | 2 | 10 | 18 | 40 | 0 | 15 |
| | Steam | 0 | 0 | 0 | 19 | 10 | 2 | 17.5 | 0 | 15 |
| | Hydrocarbon gas | 17.5 | 17.5 | 31 | 19 | 25 | 18 | 17.5 | 18 | 3 |
| Kind of hydrocarbon gas | | Toluene | Benzene | Benzene | Benzene | Toluene | Benzene | Toluene | Benzene | Toluene |
| Characteristics of carbon black for battery | BET specific surface area [$m^2/g$] | 60 | 63 | 140 | 210 | 131 | 58 | 175 | 38 | 130 |
| | Crystallite diameter (La) [Å] | 40 | 41 | 34 | 35 | 37 | 40 | 38 | 38 | 41 |
| | Number of $CO_2$ desorption molecules [molecules/$m^2$] | $9.5 \times 10^{16}$ | $10 \times 10^{16}$ | $8.0 \times 10^{16}$ | $8.2 \times 10^{16}$ | $13 \times 10^{16}$ | $8.4 \times 10^{16}$ | $12.9 \times 10^{16}$ | $3.4 \times 10^{16}$ | $1.2 \times 10^{16}$ |
| | DBP oil absorption amount [mL/100 g] | 248 | 259 | 241 | 304 | 229 | 245 | 205 | 177 | 263 |
| | Localized electron spin density [spins/$m^2$] | $7.4 \times 10^{16}$ | $7.9 \times 10^{16}$ | $3.4 \times 10^{16}$ | $4.8 \times 10^{16}$ | $3.4 \times 10^{16}$ | $8.3 \times 10^{16}$ | $8.9 \times 10^{16}$ | $11.5 \times 10^{16}$ | $2.7 \times 10^{16}$ |
| | Grain gauge [μm] | 5 | 5 | 7 | 10 | 8 | 10 | 10 | 5 | 20 |
| | Oxidative decomposition current value [mA/$cm^2$] | 0.06 | 0.05 | 0.07 | 0.08 | 0.12 | 0.06 | 0.07 | 0.04 | 0.15 |

TABLE 1-continued

| Evaluation of conductive composition for electrode | Viscosity [Pa · s] | 11.2 | 10.5 | 12.5 | 15.8 | 15.1 | 14.5 | 15.6 | 9.8 | 27.4 |
|---|---|---|---|---|---|---|---|---|---|---|
| Evaluation of electrode for battery | Electrode plate resistance [Ω · cm$^2$] | 310 | 320 | 290 | 250 | 355 | 480 | 490 | 1050 | 770 |
| Evaluation of battery | Discharge capacity retention rate at 3 C discharge [%] | 80.7 | 80.5 | 80.8 | 82.5 | 79.4 | 78.8 | 78.3 | 65.8 | 74.5 |
| | Discharge capacity retention rate after cycles [%] | 91 | 93 | 90 | 89 | 87 | 88 | 86 | 78 | 71 |

| | | Comparative Example | | | | | | |
|---|---|---|---|---|---|---|---|---|
| | | 3 | 4 | 5 | 6 | 7 | 8 | 9 |
| Kind of carbon black for battery | | SuperPLi | ECP | CBJ | CBK | CBL | CBM | CBN |
| Ratio of material gas mixture [vol %] | Acetylene gas | — | — | 60 | 57 | 80 | 65 | 40 |
| | Oxygen Gas | — | — | 2 | 3 | 5 | 16 | 10 |
| | Steam | — | — | 25 | 20 | 7.5 | 3 | 25 |
| | Hydrocarbon gas | — | — | 13 | 20 | 7.5 | 16 | 25 |
| Kind of hydrocarbon gas | | — | — | Benzene | Benzene | Benzene | Toluene | Benzene |
| Characteristics of carbon black for battery | BET specific surface area [m$^2$/g] | 63 | 375 | 230 | 120 | 48 | 63 | 225 |
| | Crystallite diameter (La) [Å] | 39 | 43 | 29 | 43 | 33 | 38 | 29 |
| | Number of $CO_2$ desorption molecules [molecules/m$^2$] | $3.8 \times 10^{16}$ | $7.8 \times 10^{16}$ | $8.3 \times 10^{16}$ | $8.1 \times 10^{16}$ | $8.7 \times 10^{16}$ | $17.8 \times 10^{16}$ | $15.5 \times 10^{16}$ |
| | DBP oil absorption amount [mL/100 g] | 233 | 365 | 245 | 220 | 190 | 225 | 285 |
| | Localized electron spin density [spins/m$^2$] | $5.5 \times 10^{16}$ | $2.5 \times 10^{16}$ | $6.5 \times 10^{16}$ | $5.8 \times 10^{16}$ | $6.5 \times 10^{16}$ | $8.2 \times 10^{16}$ | $7.4 \times 10^{16}$ |
| | Grain gauge [μm] | 10 | 30 | 25 | 20 | 10 | 10 | 30 |
| | Oxidative decomposition current value [mA/cm$^2$] | 0.09 | 0.25 | 0.18 | 0.07 | 0.05 | 0.05 | 0.21 |
| Evaluation of conductive composition for electrode | Viscosity [Pa · s] | 11.5 | 33.8 | 27.8 | 20.7 | 9.5 | 11.5 | 28.4 |
| Evaluation of electrode for battery | Electrode plate resistance [Ω · cm$^2$] | 850 | 580 | 640 | 730 | 970 | 630 | 570 |
| Evaluation of battery | Discharge capacity retention rate at 3 C discharge [%] | 72.5 | 74.5 | 73.8 | 72.4 | 69.5 | 73.2 | 75.8 |
| | Discharge capacity retention rate after cycles [%] | 76 | 71 | 74 | 73 | 72 | 74 | 70 |

It was revealed that the carbon blacks for batteries of Examples 1 to 7 simultaneously achieved the dispersibility, electron conductivity and oxidation resistance better as compared with the carbon blacks for batteries of Comparative Examples 1 to 9. As a result, it was found that the conductive composition for a electrode of the Examples of the present invention had low viscosity, and the electrode for batteries using the conductive composition for a electrode had a low electrode resistance, so that the voltage drop during discharge could be suppressed.

Furthermore, it was revealed that the batteries of Examples 1 to 7 had higher discharge rate characteristics and higher cycle characteristics than the batteries of Comparative Examples 1 to 9. As a result, it was found that the battery using the carbon black for batteries of the present invention has suppressed output decrease while increasing the discharge current, and also has a long lifetime.

REFERENCE SIGNS LIST

1 Lithium ion battery positive electrode
2 Lithium ion battery negative electrode
3 Polyolefin microporous membrane
4 Aluminum tab
5 Nickel tab
6 External package

The invention claimed is:

1. A carbon black for batteries having:
   BET specific surface area of 50 to 220 $m^2/g$;
   a crystallite diameter (La) of 30 to 42 Å;
   a DBP oil absorption amount of 240 to 310 mL/100 g;
   a grain gauge according to JIS K 5600-2-5 of 5 to 10 μm;
   an oxidative decomposition current value of 0.05 to 0.12 $mA/cm^2$; and
   a number of $CO_2$ desorption molecules per unit surface area measured by a temperature-rising desorption gas analysis method of $8.0 \times 10^{16}$ to $15.0 \times 10^{16}$ molecules/$m^2$, wherein the temperature-rising desorption gas analysis method is performed at 50° C. to 1200° C. of measurement temperature.

2. The carbon black of claim 1, wherein the carbon black has a localized electron spin density per unit surface area at 23° C. is $8.0 \times 10^{16}$ spins/$m^2$ or less.

3. The carbon black of claim 1, wherein the carbon black is an acetylene black.

4. A conductive composition for an electrode comprising an active material, a polymer binder and the carbon black of claim 1.

5. An electrode for batteries comprising the carbon black of claim 1.

6. A battery comprising the electrode of claim 5.

* * * * *